US011970035B2

(12) United States Patent
Konada et al.

(10) Patent No.: US 11,970,035 B2
(45) Date of Patent: Apr. 30, 2024

(54) SUSPENSION DEVICE

(71) Applicant: HONDA MOTOR CO., LTD., Tokyo (JP)

(72) Inventors: Kazuya Konada, Saitama (JP); Takashi Yanagi, Saitama (JP); Ryosuke Yamazaki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/814,833

(22) Filed: Jul. 26, 2022

(65) Prior Publication Data
US 2023/0037678 A1 Feb. 9, 2023

(30) Foreign Application Priority Data

Aug. 9, 2021 (CN) .................. 202110906790.X

(51) Int. Cl.
*B60G 17/015* (2006.01)
*B60G 17/0185* (2006.01)
*B60G 17/019* (2006.01)

(52) U.S. Cl.
CPC ..... *B60G 17/0152* (2013.01); *B60G 17/0185* (2013.01); *B60G 17/019* (2013.01); *B60G 2202/24* (2013.01); *B60G 2202/25* (2013.01)

(58) Field of Classification Search
CPC . F16F 15/002; B60G 2202/25; B60G 17/019; B60G 17/0185
See application file for complete search history.

(56) References Cited

U.S. PATENT DOCUMENTS

| 7,245,995 | B2 * | 7/2007 | Kueperkoch | ...... B60G 17/0185 |
| | | | | 701/33.9 |
| 7,877,177 | B2 * | 1/2011 | Kueperkoch | ........... B60T 8/885 |
| | | | | 180/21 |
| 8,209,087 | B2 * | 6/2012 | Hagglund | ............ B60G 17/005 |
| | | | | 280/5.506 |
| 10,633,047 | B2 * | 4/2020 | Wang | ......................... F16F 6/00 |
| 10,987,987 | B2 * | 4/2021 | Graus | ............... B60G 17/0165 |
| 11,376,917 | B2 * | 7/2022 | Simon | ................ B60G 17/0565 |
| 11,560,033 | B2 * | 1/2023 | Yamazaki | .............. B62D 35/02 |

(Continued)

FOREIGN PATENT DOCUMENTS

| CN | 110722948 A | | 1/2020 | |
| EP | 2058155 A1 * | | 5/2009 | ............. B60G 13/14 |

(Continued)

OTHER PUBLICATIONS

Machine translation of KR 19980077064 A from espacenet.com (Year: 2023).*

(Continued)

*Primary Examiner* — Paul N Dickson
*Assistant Examiner* — Maxwell L Meshaka
(74) *Attorney, Agent, or Firm* — CKC & Partners Co., LLC

(57) ABSTRACT

The suspension device for vehicles includes: an electric damper which operates by electricity; a fluid pressure damper which operates by hydraulic pressure; a road-surface state detector which detects a road-surface state ahead of a tire of a vehicle; and a controller which causes at least one to operate among the electric damper and the fluid pressure damper, based on a detection result of the road-surface state detector.

5 Claims, 13 Drawing Sheets

(56) References Cited

U.S. PATENT DOCUMENTS

| | | | |
|---|---|---|---|
| 2004/0162650 A1* | 8/2004 | Kueperkoch | B60T 8/885 701/29.2 |
| 2008/0059018 A1* | 3/2008 | Kueperkoch | B60G 17/0185 701/30.3 |
| 2008/0077293 A1* | 3/2008 | Fitzgibbons | B60G 17/0185 280/5.514 |
| 2009/0079145 A1 | 3/2009 | Inoue et al. | |
| 2009/0138157 A1* | 5/2009 | Hagglund | F16F 9/56 280/5.507 |
| 2013/0103259 A1 | 4/2013 | Eng et al. | |
| 2019/0185083 A1* | 6/2019 | Wang | H02K 41/03 |
| 2021/0061046 A1* | 3/2021 | Simon | B66F 11/04 |
| 2021/0252931 A1* | 8/2021 | Yamazaki | B60G 17/06 |
| 2022/0281279 A1* | 9/2022 | Yamazaki | B60G 17/0157 |
| 2022/0282767 A1* | 9/2022 | Yamazaki | F16F 9/185 |
| 2022/0289303 A1* | 9/2022 | Yamazaki | B62D 25/085 |
| 2022/0290984 A1* | 9/2022 | Yamazaki | B60W 40/06 |
| 2022/0290987 A1* | 9/2022 | Konada | G01S 13/08 |
| 2022/0297493 A1* | 9/2022 | Konada | B60G 17/0164 |
| 2022/0297494 A1* | 9/2022 | Konada | B60G 17/0152 |
| 2022/0297496 A1* | 9/2022 | Konada | B60G 17/0165 |
| 2022/0297497 A1* | 9/2022 | Yamazaki | B60G 17/0161 |
| 2022/0305862 A1* | 9/2022 | Konada | B60G 17/06 |
| 2022/0305863 A1* | 9/2022 | Konada | B60G 17/0195 |
| 2022/0305864 A1* | 9/2022 | Konada | B60G 17/0195 |
| 2022/0305865 A1* | 9/2022 | Ohno | B60G 17/0195 |
| 2022/0305866 A1* | 9/2022 | Konada | B60W 10/22 |
| 2022/0305867 A1* | 9/2022 | Konada | B60G 17/06 |
| 2022/0305868 A1* | 9/2022 | Konada | B60G 17/019 |
| 2022/0305869 A1* | 9/2022 | Ohno | B60G 17/0195 |
| 2023/0037678 A1* | 2/2023 | Konada | F16F 15/002 |
| 2023/0093936 A1* | 3/2023 | Konada | B60G 17/018 701/37 |
| 2023/0107483 A1* | 4/2023 | Konada | B60G 17/016 701/37 |
| 2023/0111355 A1* | 4/2023 | Vandersmissen | G01M 3/2876 701/37 |
| 2023/0113913 A1* | 4/2023 | Calchand | B60G 17/0152 701/37 |
| 2023/0141330 A1* | 5/2023 | Konada | B60G 17/06 280/5.514 |

FOREIGN PATENT DOCUMENTS

| | | | | |
|---|---|---|---|---|
| JP | H05262118 A | | 10/1993 | |
| JP | 2002227927 A | | 8/2002 | |
| JP | 2006298007 A | | 11/2006 | |
| JP | 2009166647 A | | 7/2009 | |
| JP | 2009234323 A | | 10/2009 | |
| JP | 2020111144 A | | 7/2020 | |
| JP | 2021129483 A | * | 9/2021 | B60G 13/00 |
| KR | 19980077064 A | * | 11/1998 | |
| KR | 20170059052 A | * | 5/2017 | |
| KR | 102273469 B1 | * | 7/2021 | |

OTHER PUBLICATIONS

Machine translation of JP 2002227927 A from espacenet.com (Year: 2023).*

Notification of Reasons for Refusal issued in the JP Patent Application No. 2022-124643, mailed on Dec. 5, 2023.

* cited by examiner

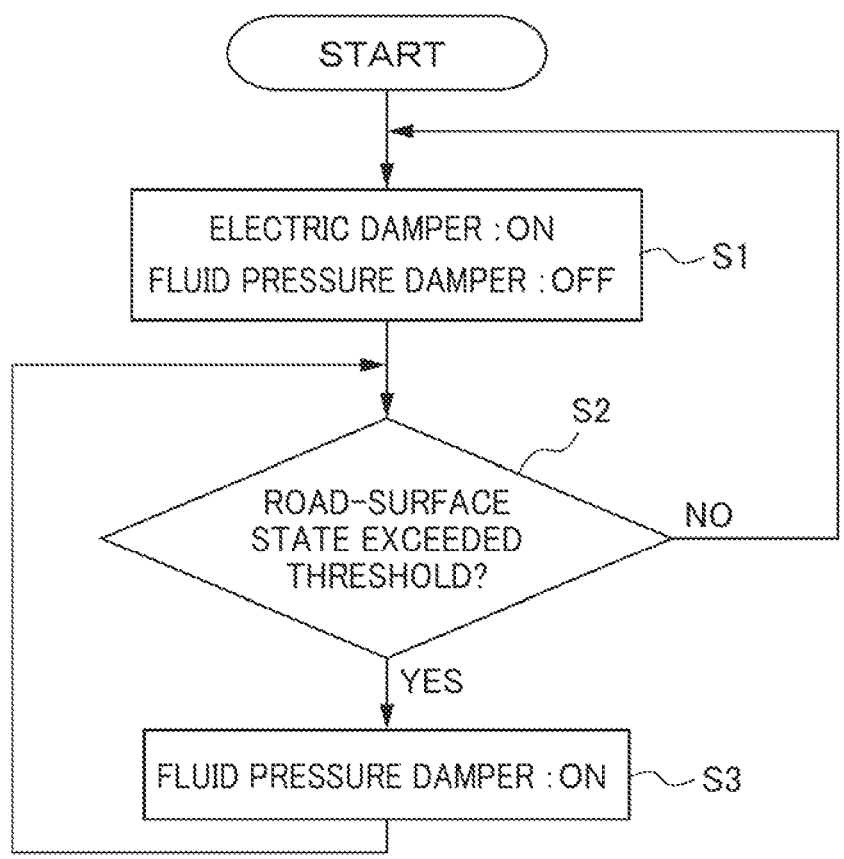

SUSPENSION DEVICE

This application is based on and claims the benefit of priority from Chinese Patent Application No. 202110906790.X, filed on 9 Aug. 2021, the content of which is incorporated herein by reference.

BACKGROUND OF THE INVENTION

Field of the Invention

The present invention relates to a suspension device.

Related Art

Conventionally, a suspension device for vehicles has been known which houses a fluid pressure damper which operates by fluid pressure inside of an electric damper which operates by electricity (for example, refer to Patent Document 1).

In this suspension device, an electric damper is configured so as to generate a damping force in a central part of an elongation/contraction dynamic range, and generates a relatively small damping force at the ends of the dynamic range. On the other hand, the fluid pressure damper is configured so as to generate a small damping force in the central part of the contraction/elongation dynamic range, and generate a large damping force at the ends of the dynamic range. It is said that favorable damping force is thereby obtained in the entire range of contraction/elongation dynamics.

Patent Document 1: Japanese Unexamined Patent Application, Publication No. 2002-227927

SUMMARY OF THE INVENTION

However, with the above-mentioned suspension device, since the damping force of the fluid pressure damper is greater than the damping force of the electric damper at the ends of the contraction/elongation dynamic range, even in a road surface state in which it is desired to generate thrust of the electric damper at the ends of the dynamic ranges, there is concern over the thrust of the electric damper being consumed by the damping force of the fluid pressure damper, and thus the fluid pressure damper working so as to interfere with the thrust of the electric damper. Therefore, the conventional suspension device has issues from the viewpoint of improving the comfort of the vehicle.

The present invention has an object of providing a suspension device for vehicles which can appropriately use the damping force (thrust) of each of an electric damper and fluid pressure damper according to a road surface state, and can improve the comfort of a vehicle.

A suspension device for vehicles according to a first aspect of the present invention (for example, the suspension device 1 described later) includes: an electric damper (for example, the electric damper 6 described later) which operates by electricity; a fluid pressure damper (for example, the fluid pressure damper 7 described later) which operates by hydraulic pressure; a road-surface state detector (for example, the road-surface state detector 200 described later) which detects a road-surface state ahead of a tire of a vehicle; and a controller (for example, the controller 300 described later) which causes at least one to operate among the electric damper and the fluid pressure damper, based on a detection result of the road-surface state detector.

According to a second aspect of the present invention, in the suspension device for vehicles as described in the first aspect, the controller may control so as to cause the fluid pressure damper to operate, in a case of a road-surface state detected by the road-surface state detector being determined as exceeding a predetermined threshold which can be handled by only the electric damper.

According to a third aspect of the present invention, in the suspension device for vehicles as described in the first aspect, the controller may so as to cause the fluid pressure damper to operate in a case of the vehicle being in at least any one case among a case of being in an energy saving mode, a case of not being able to output an instruction due to failure of the controller, and a case of not being able to control the suspension device electrically.

According to the first aspect of the present invention, it is possible to understand the information of the road-surface state by the road-surface state detector, and possible to operate at least one among the electric damper and fluid pressure damper according to this road-surface state. For example, by configuring so as not to generate damping force of the fluid pressure damper when it is desired to generate thrust of the electric damper, it is possible to avoid the fluid pressure damper from hindering operation of the electric damper. For this reason, it is possible to improve the comfort of the vehicle. However, in the case of the direction of generated thrusts of the electric damper and fluid pressure damper being the same, by allowing both the electric damper and fluid pressure damper to operate, it is possible for the fluid pressure damper to assist the thrust of the electric damper. For this reason, it becomes possible to make the generated thrust required of the electric damper smaller, and a size reduction of the suspension device is possible.

According to the second aspect of the present invention, for example, as in the case of the tire riding over a large level difference, in the case of a large input which cannot be handled by only the electric damper being detected, it is possible to use the damping force (thrust) of the fluid pressure damper by causing the fluid pressure damper to operate. In a case of allowing both the electric damper and the fluid pressure damper to operate, the fluid pressure damper can appropriate assist the damping force (thrust) of the electric damper, and thus it is possible to further improve the comfort of the vehicle.

According to the third aspect of the present invention, by causing the fluid pressure damper to operate in at least any one case among a case of the vehicle being in an energy saving mode due to a decline in battery capacity, etc., a case of not being able to output an instruction due to failure, etc. of the controller, and a case of not being able to control the suspension device electrically due to heat, etc., since it is possible to reduce the thrust of the electric damper, the electricity consumption of the battery can be curbed.

BRIEF DESCRIPTION OF THE DRAWINGS

FIG. 11 is a flowchart showing an example of control of the suspension device for vehicles according to an embodiment of the present invention;

DETAILED DESCRIPTION OF THE INVENTION

Figure 1:
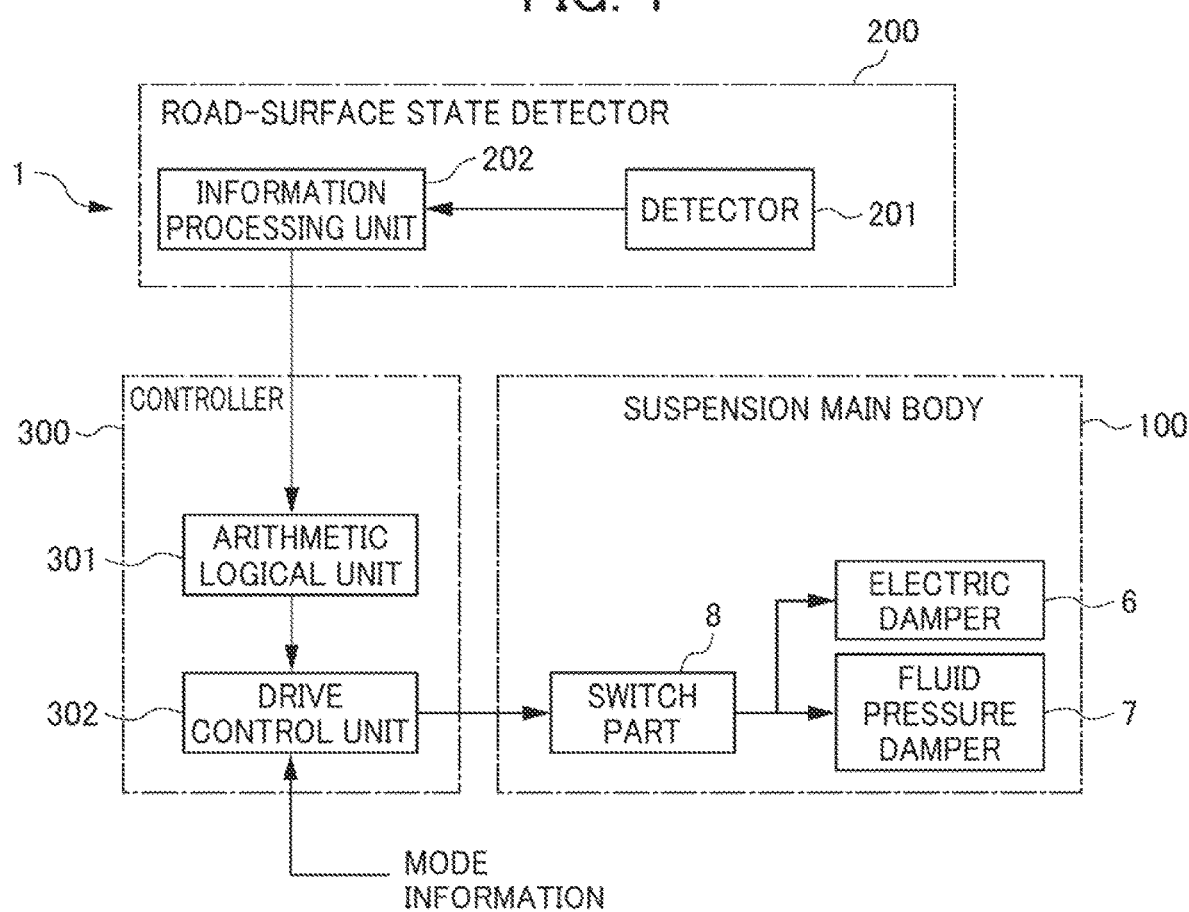
FIG. 1 is a block diagram showing an outline configuration of a suspension device for vehicles according to an embodiment of the present invention.

Hereinafter, an embodiment of the present invention will be explained in detail by referencing the drawings. FIG. 1 is a block diagram showing an outline configuration of a suspension device for vehicles according to an embodiment of the present invention. The suspension device 1 is configured to include a suspension main body 100, a road-surface state detector 200, and a controller 300.

The suspension main body 100 integrally includes; an electric damper (electromagnetic damper) 6 which operates with electricity; and a fluid pressure damper 7 which operates with hydraulic pressure (oil pressure). With the suspension main body 100 of the present embodiment, the fluid pressure damper 7 is concentrically provided inside of the electric damper 6. Therefore, first, the configuration of the suspension main body 100 will be explained using FIGS. 2 to 6.

Figure 2:
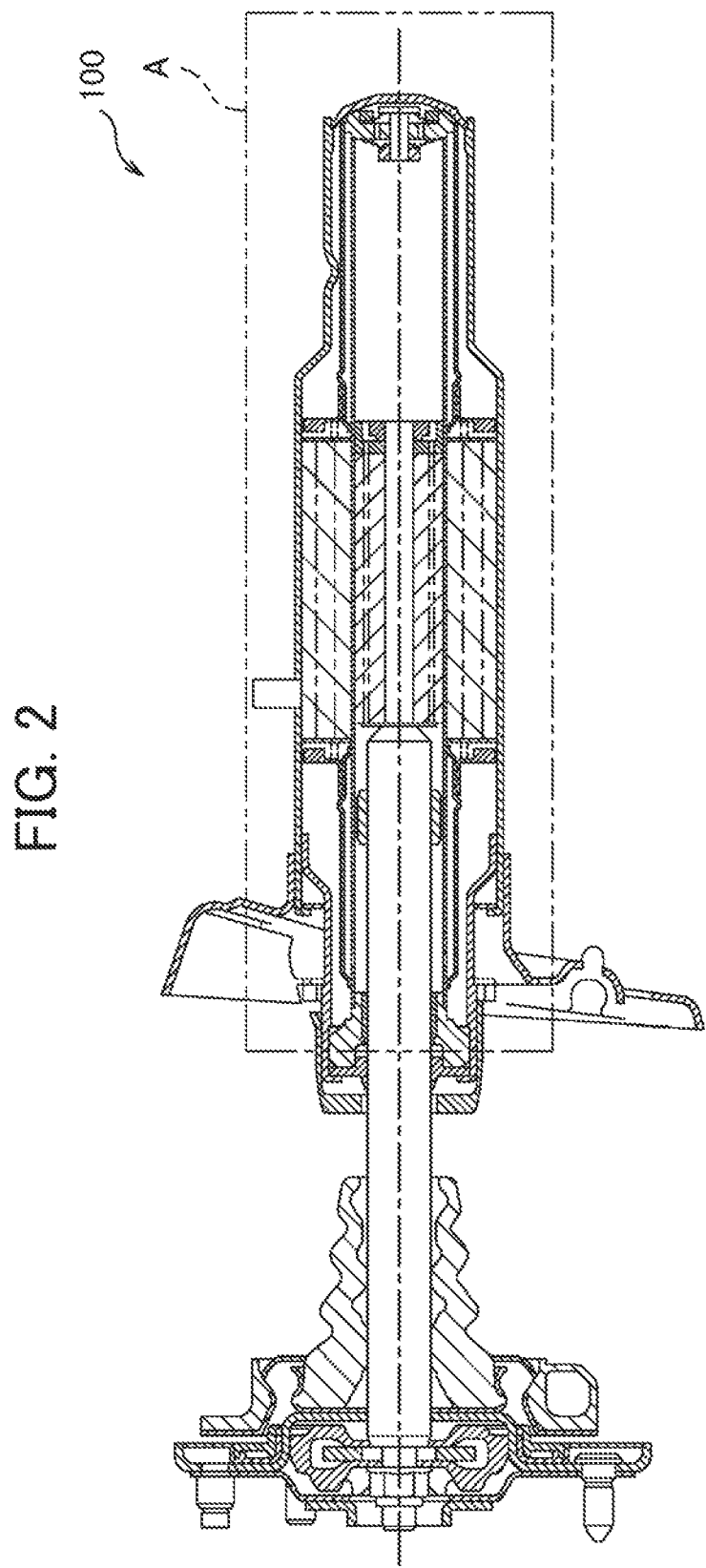
FIG. 2 is a cross-sectional view showing a suspension main body of the suspension device for vehicles according to an embodiment of the present invention.
Figure 3:
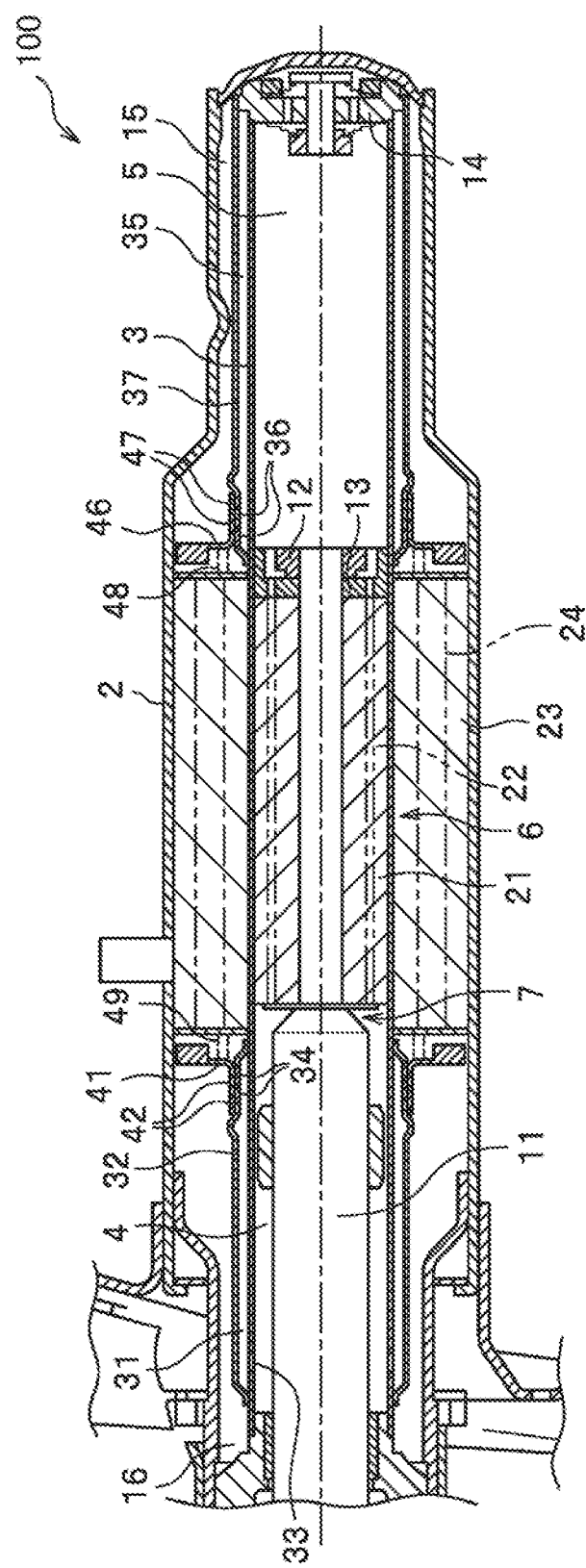
FIG. 3 is a cross-sectional view showing part A in FIG. 2 to be enlarged.

FIG. 2 is a cross-sectional view showing a suspension main body of a suspension device which is an embodiment of the present invention. FIG. 3 is a cross-sectional view showing part A in FIG. 2 to be enlarged. An inner cylinder 3 is stored inside of an outer housing 2 of the suspension main body 100. Hereinafter, a leading end part side on the right side in FIG. 3 of the suspension main body 100 may be called the leading end side. The left side in FIG. 3 of the suspension main body 100 may be called the rear side.

The fluid pressure damper 7 is configured from a rod 11, piston 12, valves 13, 14, etc. The fluid pressure damper 7 functions as a conventional suspension. In other words, the rod 11 which is coaxial core to the inner cylinder 3 is stored inside of the inner cylinder 3. The rod 11 is moveable within the inner cylinder 3 in a longitudinal direction (left/right direction in FIG. 3) of the inner cylinder 3. The piston 12 is provided at the leading end side (right side) in the longitudinal direction of the rod 11. The outer circumferential surface of the piston 12 moves along the inner circumferential surface of the inner cylinder 3.

Inside of the inner cylinder 3 is divided by the piston 12 into a first fluid chamber 4 on the rear side of the piston 12, and a second fluid chamber 5 on the leading end side of the piston 12. A cylindrical magnet 21 is provided to the piston 12. A magnet inner channel 22 which conducts between the first fluid chamber 4 and second fluid chamber 5 is provided inside of the magnet 21. The valve 13 is provided to a lead part of the piston 12 of the magnet inner channel 22. The valve 14 is provided to a lead part of the inner cylinder 3. The valve 14 can conduct between the inside of the inner cylinder 3, and a space 15 between the inner cylinder 3 and outer housing 2. The space within the suspension main body 100 is filled with a fluid such as oil. For this reason, by displacing the rod 11 between the first fluid chamber 4 and second fluid chamber 5 in a state opening the valves 13 and 14, the fluid flows through the magnet inner channel 22 and valves 13 and 14. The piston 12 is thereby mobile, and the fluid pressure damper 7 can thereby generate fluid pressure.

The electric damper 6 is configured from the magnet 21, coil 23, etc. The electric damper 6 functions as an electromagnetic-type suspension. In other words, the cylindrical coil 23 (actuator) is provided between the outer housing 2 and inner cylinder 3. By energizing this coil 23, a magnetic field is generated, and by this magnetic field acting on the magnet 21, the piston 12 and rod 11 can be movable in the azial direction thereof. A space 16 is provided between the outer housing 2 and the inner cylinder 3. A coil inner channel 24 is provided inside of the coil 23. The coil inner channel 24 conducts between the space 15 and space 16.

A bypass channel chamber 31 is provided on the inner side of the space 16, and the outer side of the inner cylinder 3. At the rear side of a wall of the inner cylinder 3 constituting the bypass channel chamber 31, a bypass hole 33 conducting between the first fluid chamber 4 and bypass channel chamber 31 is provided. At the leading end side of a wall 32 on the side of the space 16 of the bypass channel chamber 31, a bypass hole 34 conducting between the space 16 and bypass channel chamber 31 is provided. The first fluid chamber 4 and space 16 can communicate via the bypass channel chamber 31 and bypass holes 33 and 34.

Similarly, a bypass channel chamber 35 is provided to the inner side of the space 15 and outer side of the inner cylinder 3. At the rear side of the wall 37 on the side of the space 15 of the bypass channel chamber 35, a bypass hole 36 conducting between the space 15 and bypass channel chamber 35 is provided. The leading end side of the bypass channel chamber 35 is free, and the second fluid chamber 5 and space 15 can communicate via the bypass channel chamber 35 and bypass hole 36.

In this way, a communication path communicating between the first fluid chamber 4 and second fluid chamber 5 without going through the valve 13 is configured, by the bypass channel chamber 31, space 16, coil inner channel 24, space 15, bypass channel chamber 35, etc.

Figure 4:
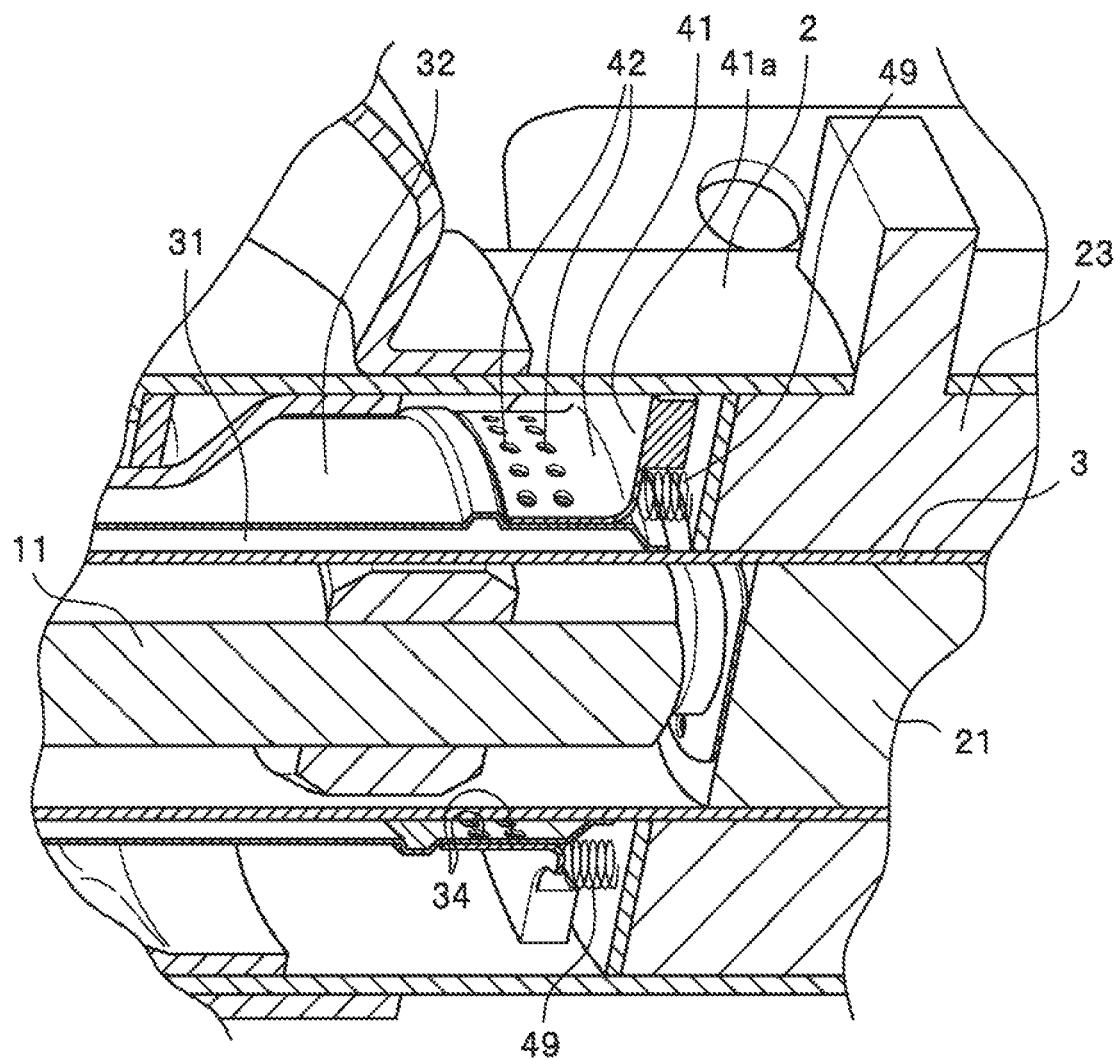
FIG. 4 is a perspective view showing a shutter member provided to the suspension main body of the suspension device for vehicles according to an embodiment of the present invention to be enlarged.

An annular shutter member 41 is slidably coiled around the position of the bypass hole 34 of the inner cylinder 3. FIG. 4 is a perspective view showing a portion of the shutter member 41 to be enlarged. A plurality of punched holes 42 is formed in an annular portion of the shutter member 41. A brim-shaped member 41a overhangs towards outside from the annular shutter member 41. Referring back to FIG. 3, the shutter member 41 is biased to the rear side in the axial direction of the inner cylinder 3 by a spring 49. In this state, the shutter member 41 is blocking the bypass hole 34. The shutter member 41 is made of metal, and is mobile against the biasing force of a spring 49, by action of the magnetic field generated by energizing the coil 23. The positions of the bypass hole 34 and punched hole 42 thereby coincide, and the bypass hole 34 is open.

In FIG. 3, the annular shutter member 46 is slidably coiled around the position of the bypass hole 36 of the inner cylinder 3. The configuration of the shutter member 46 is similar to the shutter member 41. In an annular portion of the shutter member 46, a plurality of punched holes 47 is formed. The shutter member 46 is biased to the leading end side in the axial direction of the inner cylinder 3 by the spring 48. In this state, the shutter member 46 blocks the bypass hole 36. The shutter member 46 is made of metal, and is movable against the biasing force of the spring 48, by the action of the magnetic field generated by energizing the coil 23. The positions of the bypass hole 36 and punched hole 47 thereby coincide, and the bypass hole 36 is open.

By the bypass holes 34, 36 being open, the bypass channel chamber 31, space 16, coil inner channel 24, space 15, and bypass channel chamber 35 make a communication path communicating the first fluid chamber 4 and second fluid chamber 5 without going through the valve 13. The shutter members 41 and 46 configure an opening/closing part which opens and closes a communication path in this case.

As is evident from the above explanation, the electric damper 6 is an electromagnetic damper using the magnetic force produced from a linear motor configured from the magnet 21, coil 23, etc. The shutter members 41, 46 making the opening/closing part use the magnetic force produced from the linear motor when open.

Figure 5:
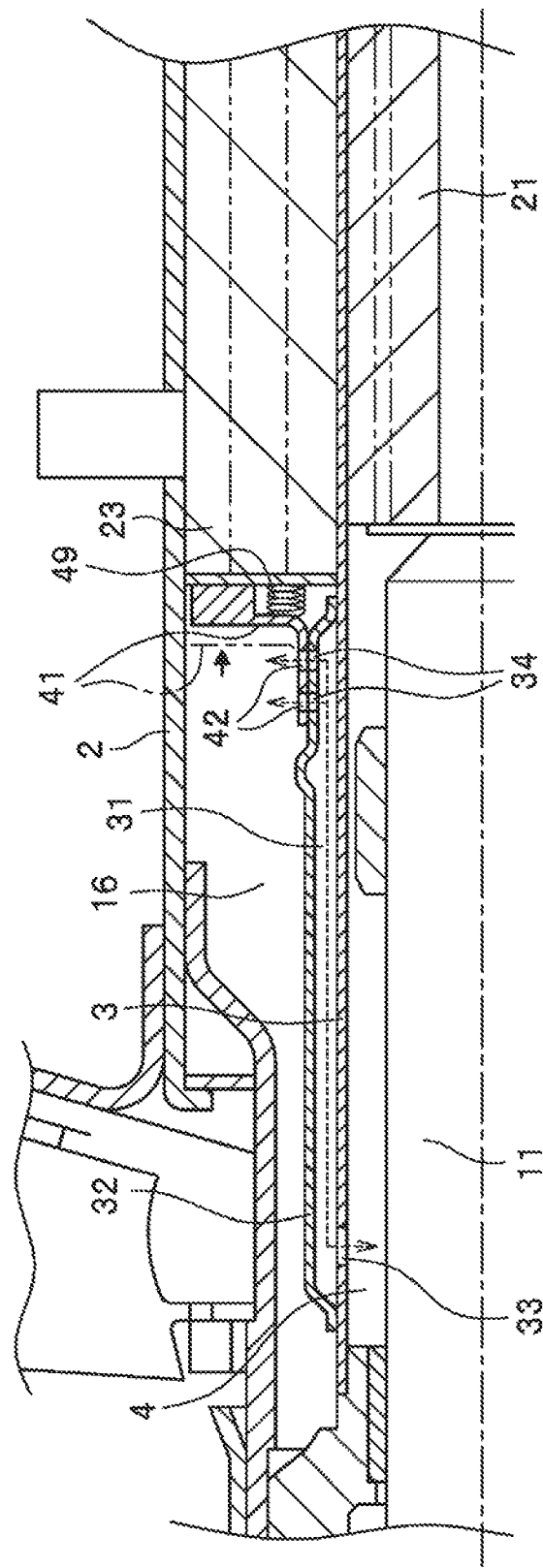
FIG. 5 is a cross-sectional view showing a portion of FIG. 3 to be enlarged.
Figure 6:
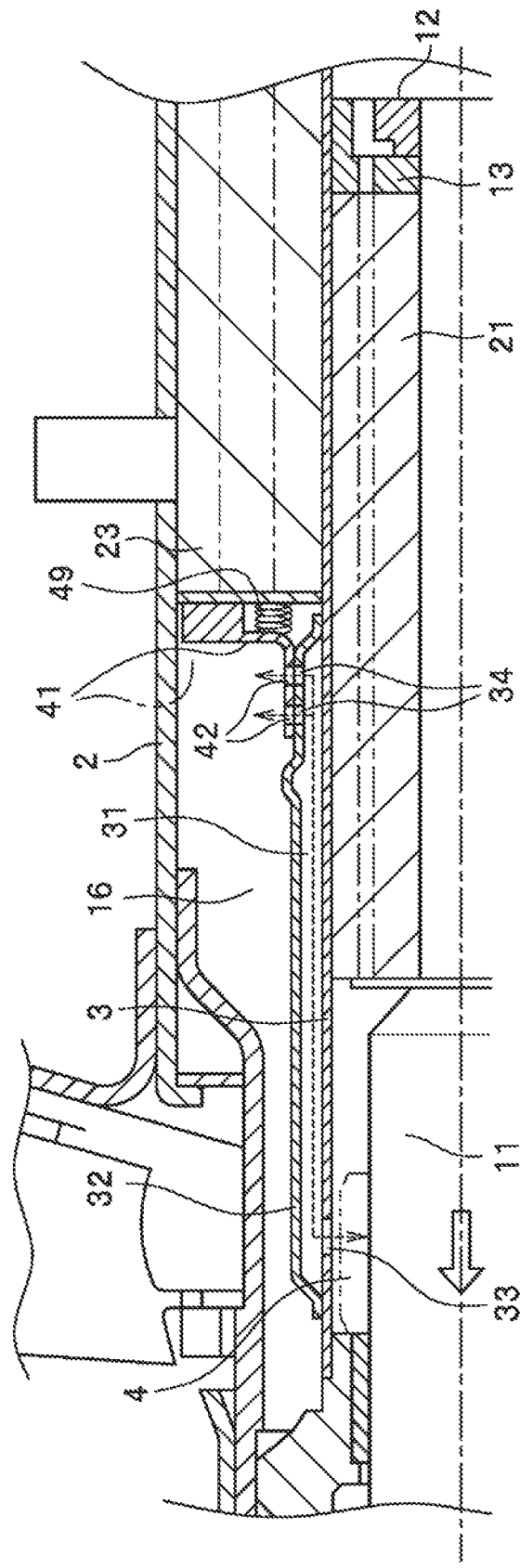
FIG. 6 is a cross-sectional view showing when the electric damper in FIG. 5 is maximum stroke.

FIG. 5 is a cross-sectional view showing a portion of FIG. 3 to be enlarged. FIG. 6 is a view showing when the electric damper 6 in FIG. 5 is the maximum stroke. The bypass hole 33 between the first fluid chamber 4 and bypass channel chamber 31 is provided at a position which is not blocked by the magnet 21 during the maximum stroke of the electric damper 6, as shown in FIG. 6.

Figure 7:
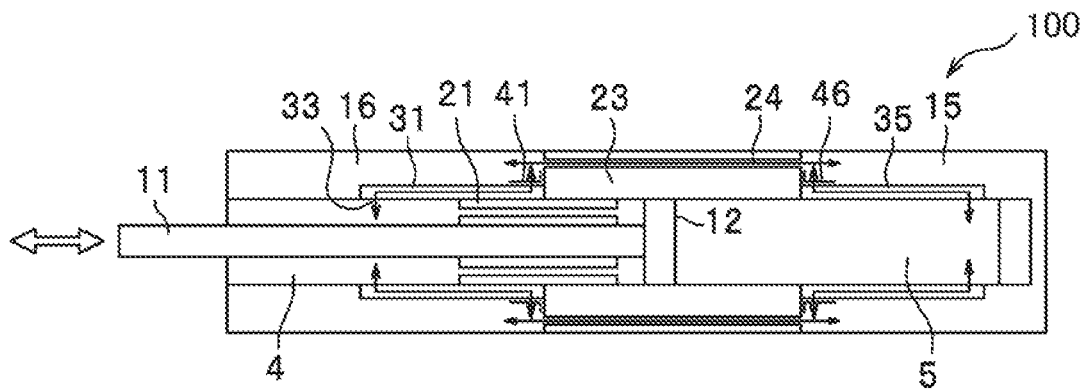
FIG. 7 is a conceptual diagram illustrating a state operating only the electric damper in the suspension main body of the suspension device for vehicles according to an embodiment of the present invention.
Figure 8:
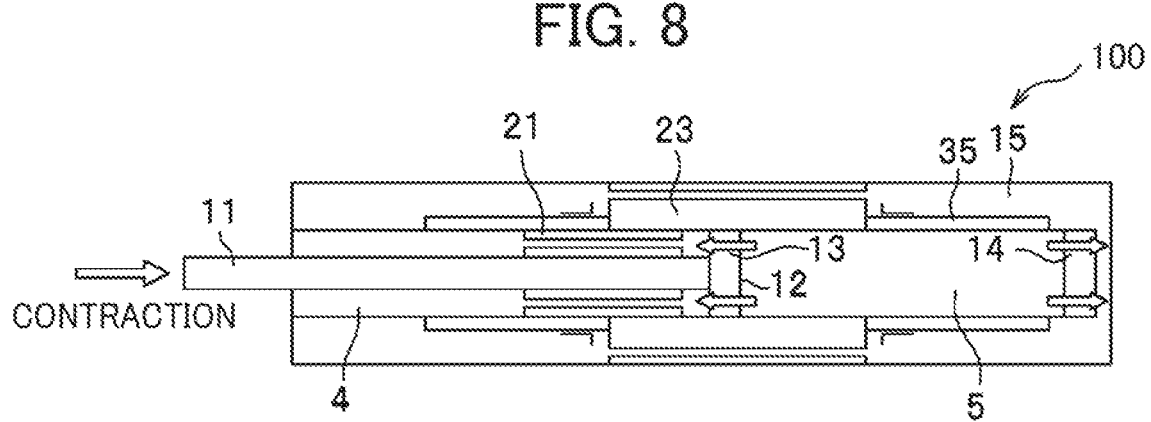
FIG. 8 is a conceptual diagram illustrating a state of contraction operating a fluid pressure damper in the suspension main body of the suspension device for vehicles according to an embodiment of the present invention.
Figure 9:
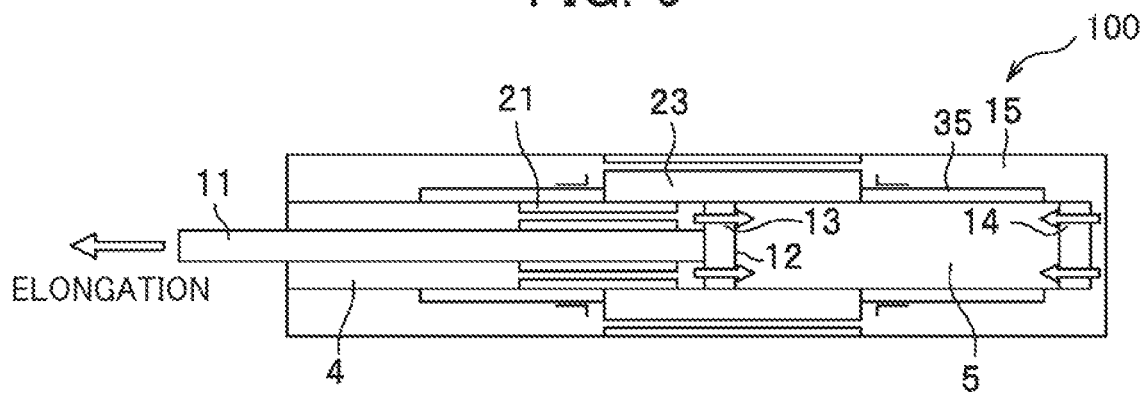
FIG. 9 is a conceptual diagram illustrating a state of elongation operating a fluid pressure damper in the suspension main body of the suspension device for vehicles according to an embodiment of the present invention.

Next, the operation of the suspension main body 100 of the present embodiment will be explained using FIGS. 7 to 9. FIGS. 7 to 9 are conceptual diagrams each explaining operation of the suspension main body 100.

During normal travel, the suspension main body 100 allows only the electric damper 6 to operate (ON), and makes the fluid pressure damper 7 inactive (OFF), as shown in FIG. 7. It should be noted that during normal travel indicates a time when the vehicle travels on a road surface normally. In the case of a user being able to select the travel mode, during normal travel indicates a time when the vehicle is set to normal mode and is traveling on a road surface.

In the suspension main body 100, in the case of allowing only the electric damper 6 to operate, and making the fluid pressure damper 7 inactive, the shutter members 41 and 46 are operated so as to open. Each chamber is thereby linked via the communication path, and fluid moves in the suspension main body 100 as shown by the arrows in FIG. 7, and does not pass through the valves 13 and 14. For this reason, fluid pressure is not generated, and damping by fluid does not occur. The electric damper 6 controls the piston 12 by electromagnetic force, and generates damping force against the oscillation of the vehicle.

FIGS. 8 and 9 show a case of causing the fluid pressure damper 7 to operate (ON). FIG. 8 shows when the rod 11 contracts (enters inside the suspension main body 100), and FIG. 9 shows when the rod 11 extends (exits from within the suspension main body 100). At this time, the shutter members 41 and 46 are closed. When this is done, the flow of fluid such as that shown by arrows in FIG. 7 ceases. For this reason, the fluid pressure damper 7 generates a damping force against the oscillations of the vehicle by using the valves 13 and 14, similarly to a normal double-cylinder type damper.

Referring back to FIG. 1, the suspension main body 100 has the electric damper 6 and fluid pressure damper 7 which are independently operable from each other, as explained above. Furthermore, the suspension main body 100 has the switching part 8 which switches the propriety (ON/OFF) of actuation of the electric damper 6 and fluid pressure damper 7. The switching part 8 of the suspension main body 100 of the present embodiment performs output and isolation of electrical current to the coil 23, and operates the above-mentioned shutter members 41 and 46 to open/close.

A road-surface state detector 200 detects a road-surface state ahead of a tire on which the vehicle is traveling therefrom, and acquires information of this road surface state. The road-surface state detector 200 has a detector 201 and information processing unit 202.

The detector 201 is a preview sensor for road-surface measurement that detects the road-surface state more ahead than the front tire of the vehicle. The detector 201 is attached to the vehicle so as to be able to detect the convex state of the road surface on which the vehicle travels therefrom. As a specific detector 201, for example, it is possible to use an image capturing device such as a camera having an image sensor such as CCD (Charge Coupled Device), a radio wave detecting device such as millimeter wave radar and optical detection range finding device such as LIDAR (Laser Imaging Detection and Ranging). The detection information of the road-surface state detected by the detector 201 is outputted to the information processing unit 202.

The information processing unit 202 processes the detection information of the road-surface state inputted from the detector 201, and generates information of the size of the convex part (height of level difference) of the road surface as quantitative information of the road-surface state. It is thereby possible to quantitatively understand the size of the convex part of the road surface on which the vehicles travels therefrom. The information of the size of the convex part of the road surface generated by the information processing unit 202 is outputted to the controller 300.

The controller 300 determines the propriety of actuation of each of the electric damper 6 and fluid pressure damper 7 of the suspension main body 100 based on the detection results of the road-surface state detector 200, and controls ON/OFF of actuation of each of the electric damper 6 and fluid pressure damper 7. The controller 300 has an arithmetic logical unit 301 and drive control unit 302. The controller 300 is composed of a processor, for example. The functions of each part of the controller 300 are realized by executing predetermined software.

The arithmetic logical unit 301 compares the information of the size of the convex part of the road surface inputted from the information processing unit 202 of the road-surface state detector 200 with a predetermined threshold set in advance, and distinguishes whether the size of the convex part (height of convex part) of the road surface exceeds the threshold. The arithmetic logical unit 301 outputs the distinction results thereof to the drive control unit 302.

The threshold is set to a size of the convex part of the road surface which can be handled by the electric damper 6. For example, the threshold can represent the size of the convex part of the road surface determined as requiring thrust greater than the damping force capable of being outputted by the electric damper 6; size of the convex part of the road surface determined as requiring to perform damping actuation of at least a certain amount by the electric damper 6, or size of the convex part of the road surface determined as requiring operating output exceeding the response performance of the electric damper 6. In the case of the size of the convex part of the road surface exceeding the threshold, it is determined as greatly influencing the ride quality of the vehicle with only the actuation of the electric damper 6.

The drive control unit 302 operates the switching part 8 of the suspension main body 100, in order to switch the ON/OFF of operation of each of the electric damper 6 and fluid pressure damper 7 of the suspension main body 100, in response to the distinction results inputted from the arithmetic logical unit 301. The shutter members 41 and 46 of the suspension main body 100 thereby open and close. With the suspension main body 100 shown in the present embodiment, in the case of the shutter members 41 and 46 opening as described above, only the electric damper 6 operates (ON), and the fluid pressure damper 7 enters the inactive state (OFF). In the case of the shutter members 41 and 46 closing, the electric damper 6 enters a state of being inactive (OFF), and only the fluid pressure damper 7 operates (ON).

Figure 10A:
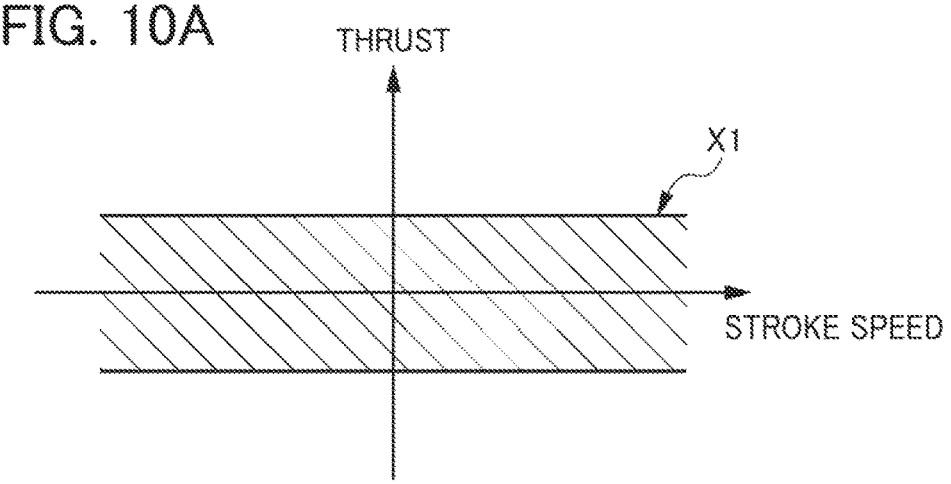
FIG. 10A is a graph showing a thrust map of an electric damper.
Figure 10B:
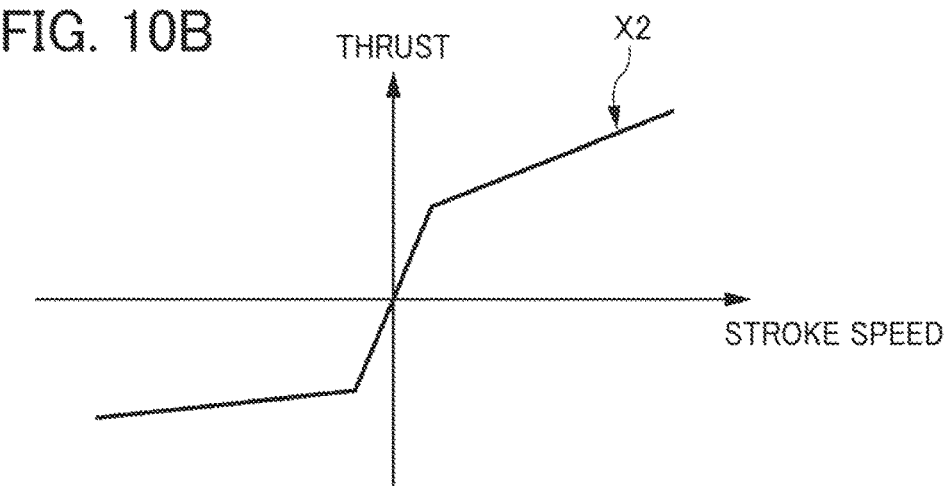
FIG. 10B is a graph showing a damping force map of a fluid pressure damper.
Figure 10C:
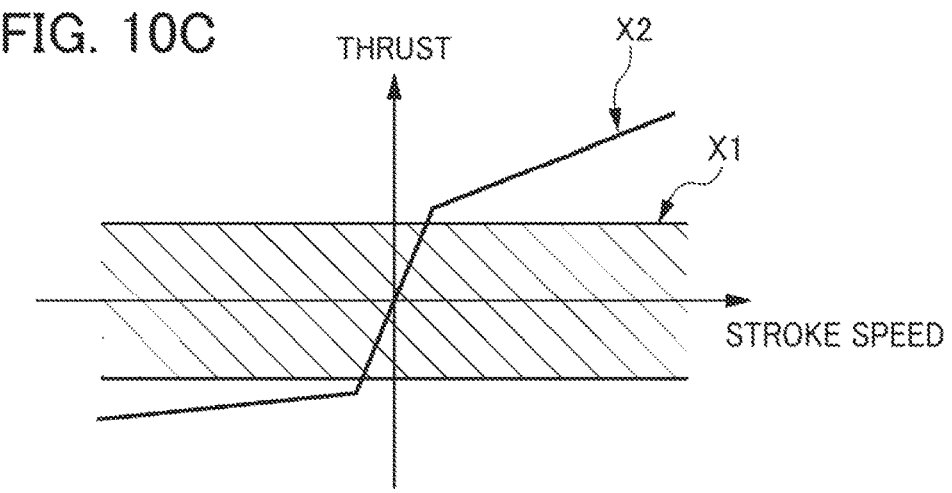
FIG. 10C is a graph showing characteristics of the electric damper and fluid pressure damper.

FIG. 10A shows a thrust map of the electric damper 6. FIG. 10B shows a damping force map of the fluid pressure damper 7. With the suspension device 1 of the present embodiment including the above-mentioned electric damper 6 and fluid pressure damper 7, as shown in FIG. 10C, it is possible to switch and use both characteristics of the characteristic X1 of the electric damper 6 and characteristic X2 of the fluid pressure damper 7. Therefore, with the suspension device 1, during normal travel, control is performed using the region of the characteristic X1 of the electric damper 6, by only the electric damper 6 operating (ON). In the case of the size of the convex part of the road surface inputted from the road-surface state detector 200 exceeding the threshold, and the operating output exceeding the response performance of the electric damper 6 becoming necessary, control is performed using the characteristic X2 of the fluid pressure damper 7 by the fluid pressure damper 7 operating (ON).

Next, an example of control of the suspension device 1 of the present embodiment will be explained using the flowchart shown in FIG. 11. It should be noted that control of the suspension device 1 of the present embodiment is started by a driving start operation of the vehicle (ON operation of ignition switch), and loops processing until a driving end operation (OFF operation of ignition switch) is executed.

During the driving start of the vehicle, the suspension device 1 is set to a normal travel mode. In the normal travel mode, the shutter members 41 and 46 of the suspension main body 100 operate to open. The electric damper 6 is thereby set to an active (ON) state, and the fluid pressure damper 7 is set to an inactive (OFF) state (Step S1).

When the vehicle starts travel, the detector 201 of the road-surface state detector 200 is always detecting the road-surface state ahead of the tire. The road-surface state detector 200 generates quantitative information of the road-surface state from the detection information of the road-surface state detected by the detector 201 in the information processing unit 202, and outputs to the controller 300. The controller 300 thereby compares between the threshold and information of the size of the convex part of the road surface in the arithmetic logical unit 301, and determines whether the size of the convex part of the road surface exceeds a predetermined threshold (Step S2).

As a result of the determination, in the case of not exceeding the threshold (Step S2: NO), the controller 300 returns to Step S1, maintains the settings of the electric damper 6 as ON and fluid pressure damper 7 as OFF, and continuously monitors the information of the road-surface state.

On the other hand, as a result of determination, in the case of exceeding the threshold (Step S2: YES), it is determined that there is a large input (high level difference) exceeding the range which can be handled by the electric damper 6, and the controller 300 outputs electrical current for operating the shutter members 41 and 46 to close to the switching part 8 of the suspension main body 100 via the drive control unit 302. The shutter members 41 and 46 thereby operate to close, and the fluid pressure damper 7 is set to the active (ON) state (Step S3). In the suspension main body 100 of the present embodiment, when the shutter members 41 and 46 operate to close, the electric damper 6 switches to the inactive (OFF) state.

By causing the fluid pressure damper 7 to operate in place of the electric damper 6, upon the rod 11 operating to contract, the damping force of the fluid pressure damper 7 is used. For this reason, the suspension main body 100 becomes able to appropriately handle even a large input (level difference) which cannot be handled by the electric damper 6, and the comfort during a large input improves.

After the fluid pressure damper 7 operates in Step S3, if there is no longer a large convex part which cannot be handled by the electric damper 6, it returns to Step S1. For this reason, the suspension main body 100 returns to the initial state in which the electric damper 6 is set to the active (ON) state, and the fluid pressure damper 7 is set to the inactive (OFF) state.

It should be noted that, as shown in FIG. 1, the suspension device 1 of the present embodiment is configured so that the mode information of the vehicle is also inputted to the drive control unit 302 of the controller 300. The mode information is information of the vehicle operating in an energy saving mode. The energy saving mode may be a mode arbitrarily set by the user. The energy saving mode may be a mode automatically set when detected that the battery capacity built into the vehicle declined to no more than a fixed value. In the case of the vehicle being a vehicle driving by an electric motor, the energy saving mode may be a mode automatically set when detected that the temperature of the electric motor is at least a predetermined threshold, or may be a mode automatically set when the integrated value of the electrical current of the electric motor within an arbitrary time becomes at least a predetermined threshold. The controller 300 controls so that, when determined that the vehicle is in the energy saving mode from the inputted mode information, the fluid pressure damper 7 is activated (ON) irrespective of the detection results of the road-surface state detector 200. Since the electric damper 6 thereby becomes inactive (OFF), it is possible to suppress power consumption of the battery.

In the above way, the suspension device 1 of the vehicle of the present embodiment includes: the electric damper 6 which operates by electricity; the fluid pressure damper 7 which operates by fluid pressure; the road-surface state detector 200 which detects the road-surface state ahead of the tires of the vehicle; and the controller 300 which controls to switch the propriety of operation of each of the electric damper 6 and fluid pressure damper 7 based on the detection results of the road-surface state detector 200. According to this, it is possible to understand the information of the road-surface state by the road-surface state detector 200, and possible to appropriately switch between the electric damper 6 and fluid pressure damper 7 according to the road-surface state thereof. For example, it is possible to avoid the fluid pressure damper 7 from obstructing the operation of the electric damper 6, by configuring so as not to generate damping force of the fluid pressure damper 7 when generating thrust of the electric damper 6. For this reason, it is possible to improve the comfort the vehicle.

The controller 300 of the present embodiment controls so as to operate the fluid pressure damper 7 in the case of determining that the road surface state detected by the road surface state detector 200 exceeds a predetermined threshold capable of being handled by only the electric damper 6. According to this, for example, as in the case of the tire riding over a large level difference, in the case of a large input which cannot be handled by the electric damper 6 being detected, it is possible to use the damping force (thrust) of the fluid pressure damper 7 by causing the fluid pressure damper 7 to operate. It is thereby possible to further improve the comfort of the vehicle.

The controller 300 of the present embodiment controls so as to cause the fluid pressure damper 7 to operate in at least any one case among a case of the vehicle being in an energy saving mode, a case of not being able to output an instruction due to failure, etc. of the controller 300, and a case of not being able to control the suspension device 1 electrically. According to this, by causing the fluid pressure damper 7 to operate in at least any one case among a case of the vehicle being in an energy saving mode due to a decline in battery capacity, etc., a case of not being able to output an instruction due to failure, etc. of the controller 300, and a case of not being able to control the suspension device 1 electrically due to heat, etc., since it is possible to reduce the thrust of the electric damper 6, the electricity consumption of the battery can be curbed.

The suspension main body 100 shown in the above embodiment switches so as to operate only either one of the electric damper 6 and fluid pressure damper 7, by operating to open and close the shutter members 41 and 46 by the magnetic force generated by energizing the coil 23. According to this, it is possible to reduce the influence on the comfort during normal travel.

Figure 12:
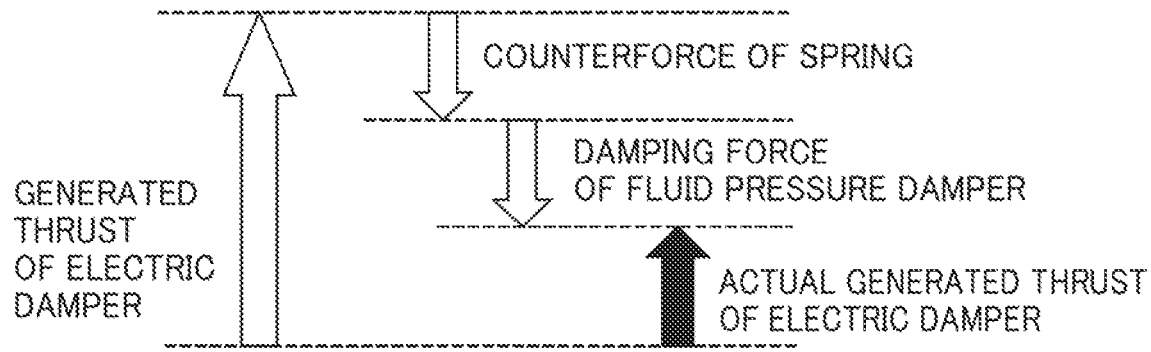
FIG. 12 is a view illustrating generated thrust (contraction side) of the electric damper when allowing the electric damper and fluid pressure damper to operate.
Figure 13:
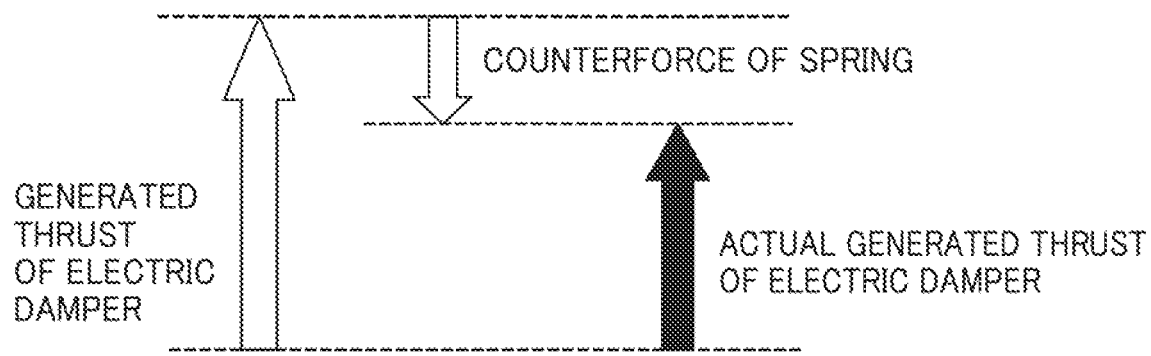
FIG. 13 is a view illustrating generated thrust (contraction side) of the electric damper when allowing only the electric damper to operate.

This will be further explained. FIG. 12 is a view for explaining the generated thrust (contraction side) of the electric damper 6 when operating both the electric damper 6 and fluid pressure damper 7. FIG. 13 is a view for explaining the generated thrust (contraction side) of the electric damper 6 when operating only the electric damper 6. As shown in FIG. 12, in a state in which both the electric damper 6 and fluid pressure damper 7 operate during normal travel, upon the rod 11 of the suspension main body 10 operating to contract, the damping force of the fluid pressure damper 7 may act so as to hinder the thrust generated by the electric damper 6, together with the counterforce of the spring (not shown) provided to the suspension main body 100. In this case, there is concern over the actual generated thrust of the electric damper 6 becoming small, and influencing the comfort during normal travel. In contrast, as shown in FIG. 13, in the state of operating (ON) only the electric damper 6, even if the generated thrust of the electric damper 6 is the same as the case of FIG. 12, the actual generated thrust becomes large compared to the case of FIG. 12. For this reason, it is possible to decrease the influence on the comfort by allowing only the electric damper 6 to operate (ON) during normal travel.

However, the suspension main body 100 may be configured to be able to jointly use actuation of the electric damper 6 and actuation of the fluid pressure damper 7, by configuring to be able to open and close the shutter members 41 and 46 independent of applying current to the coil 23.

Figure 14:
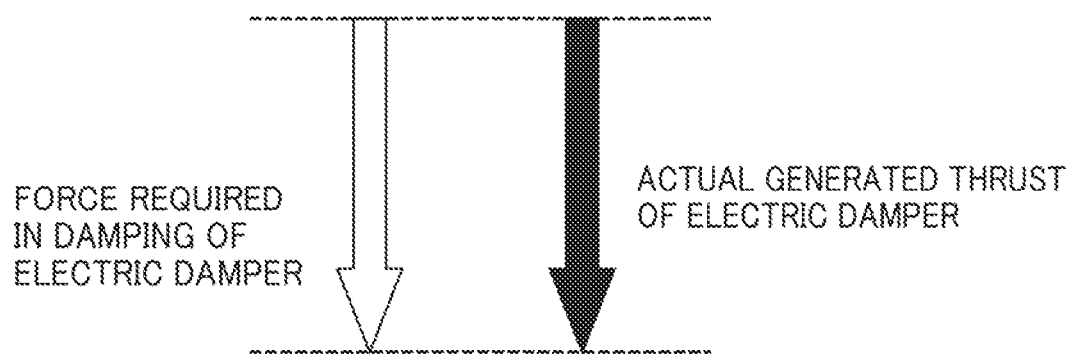
FIG. 14 is a view illustrating actual generated thrust (elongation side) of the electric damper when allowing only the electric damper to operate.
Figure 15:
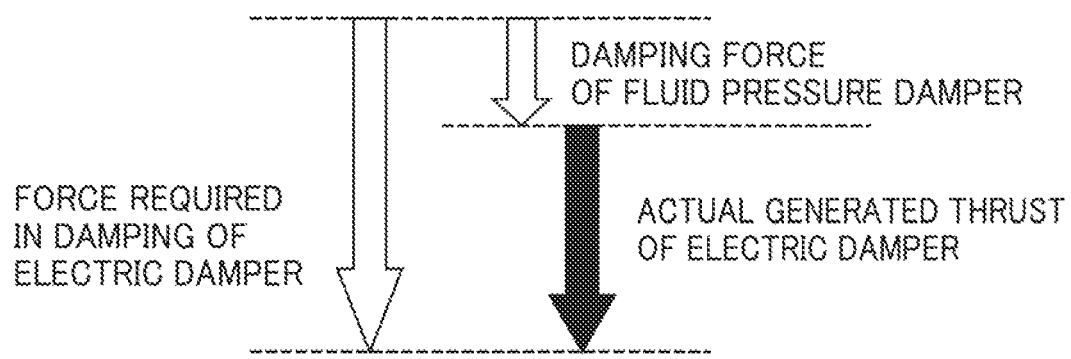
FIG. 15 is a view illustrating actual generated thrust (elongation side) of the electric damper when allowing the electric damper and fluid pressure damper to operate.

This will be further explained. FIG. 14 is a view for explaining the actual generated thrust (elongation side) of the electric damper 6 when allowing only the electric damper 6 to operate. FIG. 15 is a view for explaining the actual generated thrust (elongation side) of the electric damper 6 when allowing both the electric damper 6 and fluid pressure damper 7 to operate (ON). As shown in FIG. 14, in the case of only the electric damper 6 operating (ON), the force required in damping upon the rod 11 operating to elongate and the actual generated thrust of the electric damper 6 are substantially equal. However, in the case of allowing both the electric damper 6 and fluid pressure damper 7 to operate, in the case of the direction of generated thrust of the electric damper 6 and fluid pressure damper 7 being the same, as shown in FIG. 15, the damping force of the fluid pressure damper 7 is used against the generated thrust of the electric damper 6, and it is possible for the fluid pressure damper 7 to assist the thrust of the electric damper 6. According to this, since it is possible to make the actual generated thrust of the electric damper 6 small, size reduction of the suspension main body 100 is possible.

Figure 16A:
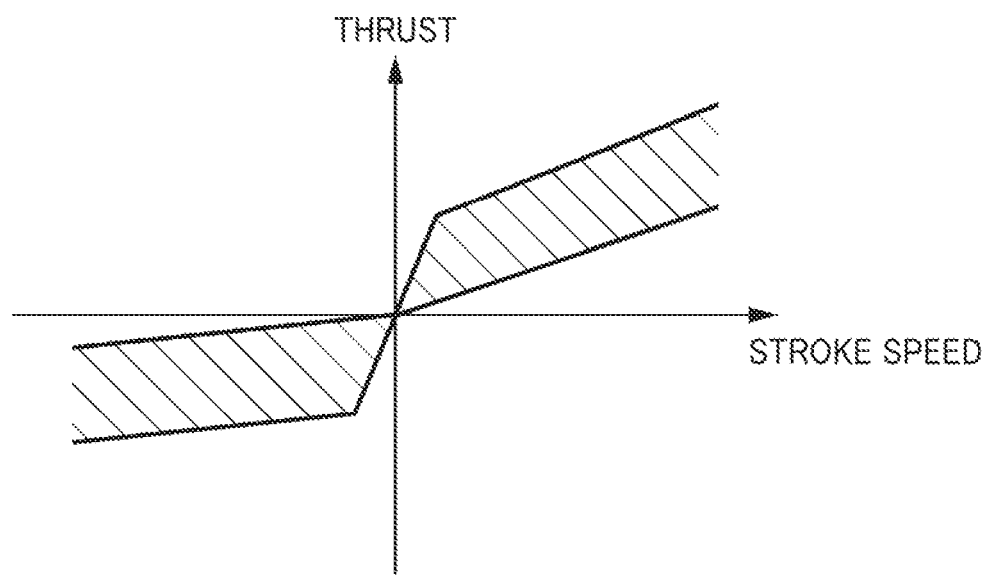
FIG. 16A is a graph shows a damping force map of a semi-active damper unit.
Figure 16B:
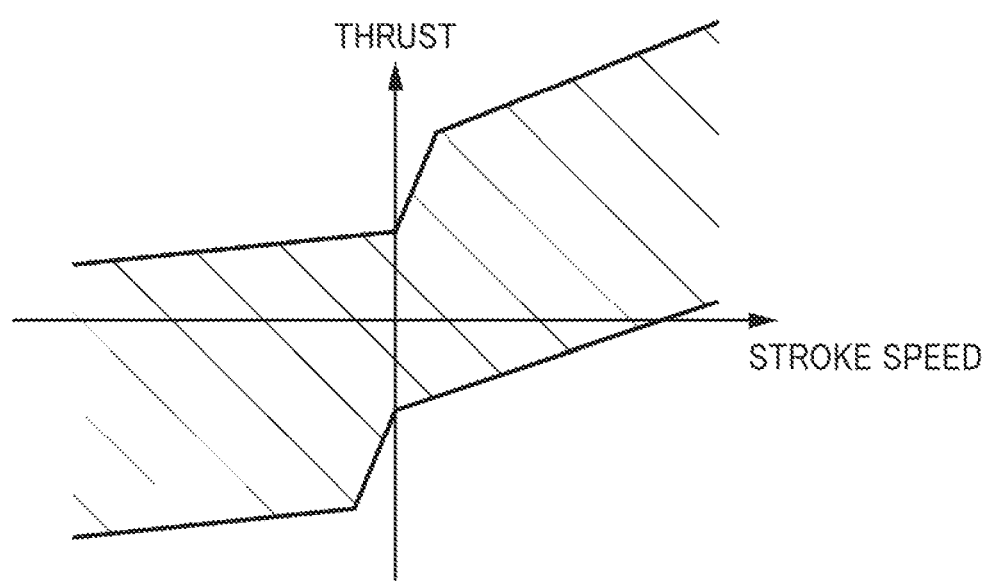
FIG. 16B is a graph showing characteristics of an electric damper and semi-active damper.

The above embodiment explains by giving an example of a hydraulic damper as the fluid pressure damper 7; however, the hydraulic damper may be a semi-active damper for which the damping force is arbitrarily controllable. For example, FIG. 16A shows a damping force map of a semi-active damper unit. In this case, with the suspension device 1 having a semi-active damper having such a characteristic and the electric damper 6, the characteristic shown in FIG. 16B is obtained by combining with the characteristic of the electric damper 6 shown in FIG. 10A. By operation/inoperation of the semi-active damper being appropriately controlled according to the detection result of the road-surface state detector 200, it is possible to maximally exhibit the performance of each damper.

Figure 17:
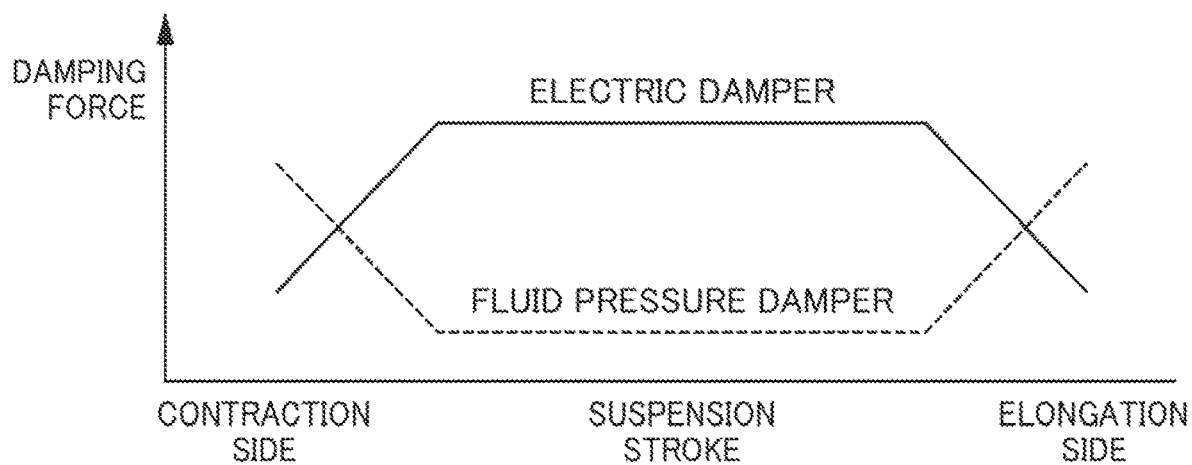
FIG. 17 is a graph illustrating the damping force of each of the electric damper and fluid pressure damper.

It should be noted that, as shown in the graph of FIG. 17, the electric damper 6 may be configured so as to generate damping force in the central part of the dynamic range of elongation and contraction, and generate comparatively small damping force at the ends of the dynamic range, and the fluid pressure damper 7 may be configured so as to generate a small damping force in the central part of the dynamic range of elongation and contraction, and generate a large damping force at the ends of the dynamic range.

EXPLANATION OF REFERENCE NUMERALS 1 suspension device
6 electric damper
7 fluid pressure damper 200 road-surface state detector
300 controller

What is claimed is:

1. A suspension device for vehicles comprising:
an electric damper which operates by electricity;
a fluid pressure damper which operates by hydraulic pressure;
a road-surface state detector which detects a road-surface state ahead of a tire of a vehicle; and
a controller which determines a propriety of actuation of each of the electric damper and the fluid pressure damper and controls ON/OFF of actuation of each of the electric damper and the fluid pressure damper, based on a detection result of the road-surface state detector,
wherein
the road-surface state detector processes detection information of the road-surface state and generates information of a size of a convex part of the road surface as quantitative information of the road-surface state, and
the controller compares the information of the size of the convex part of the road surface with a predetermined threshold set in advance, and distinguishes whether the size of the convex part of the road surface exceeds the threshold.

2. The suspension device for vehicles according to claim 1, wherein the controller controls so as to cause the fluid pressure damper to operate, in a case of a road-surface state detected by the road-surface state detector being determined as exceeding a predetermined threshold which can be handled by only the electric damper.

3. The suspension device for vehicles according to claim 1, wherein the controller controls so as to cause the fluid pressure damper to operate in a case of the vehicle being in at least any one case among a case of being in an energy saving mode, a case of not being able to output an instruction due to failure of the controller, and a case of not being able to control the suspension device electrically.

4. The suspension device for vehicles according to claim 1, wherein the threshold is set to a size of the convex part of the road surface which can be handled by the electric damper, and the threshold can represent a size of the convex part of the road surface determined as requiring thrust greater than the damping force capable of being outputted by the electric damper; a size of the convex part of the road surface determined as requiring to perform damping actuation of at least a certain amount by the electric damper, or a size of the convex part of the road surface determined as requiring operating output exceeding the response performance of the electric damper.

5. The suspension device for vehicles according to claim 1, wherein actuation of the electric damper and actuation of the fluid pressure damper can be used jointly.

* * * * *